United States Patent
Hara et al.

(10) Patent No.: US 7,042,445 B2
(45) Date of Patent: May 9, 2006

(54) INPUT DEVICE FOR MOVING CURSOR AND SCROLLING IMAGE ON SCREEN

(75) Inventors: Osamu Hara, Fukushima-ken (JP); Kouichi Ogino, Fukushima-ken (JP); Kazuhito Ooshita, Fukushima-ken (JP); Akihisa Itoh, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 20 days.

(21) Appl. No.: 09/793,009

(22) Filed: Feb. 26, 2001

(65) Prior Publication Data

US 2001/0017614 A1 Aug. 30, 2001

(30) Foreign Application Priority Data

Feb. 29, 2000 (JP) .............................. 2000-053395

(51) Int. Cl.
*G09G 5/00* (2006.01)
(52) U.S. Cl. ...................... 345/184; 345/156; 715/701; 715/702
(58) Field of Classification Search ........ 345/156–184; 341/20; 715/701, 702
See application file for complete search history.

(56) References Cited

U.S. PATENT DOCUMENTS

| 5,714,971 | A | | 2/1998 | Shalit et al. |
| 6,128,006 | A | * | 10/2000 | Rosenberg et al. .......... 345/163 |
| 6,211,861 | B1 | * | 4/2001 | Rosenberg et al. .......... 345/163 |
| 6,259,382 | B1 | * | 7/2001 | Rosenberg ................... 341/20 |
| 6,429,846 | B1 | * | 8/2002 | Rosenberg et al. .......... 345/156 |
| 6,563,487 | B1 | * | 5/2003 | Martin et al. ............... 345/156 |
| 6,697,043 | B1 | * | 2/2004 | Shahoian .................... 345/156 |

* cited by examiner

*Primary Examiner*—Sumati Lefkowitz
*Assistant Examiner*—Srilakshmi K. Kumar
(74) *Attorney, Agent, or Firm*—Brinks Hofer Gilson & Lione

(57) ABSTRACT

In the case where the operator is moving the cursor on the computer screen through the use of a mouse, when the cursor display moves to a position which coincides with any of the menu display, a boundary position of the menu display or a position which coincides with the icon display, pressure sensing power generating means within the mouse is actuated to give a shock force or the like to the operator. This enables the operator to recognize the grasp in the operating state by not only visual judgment but also by hand.

5 Claims, 5 Drawing Sheets

INPUT DEVICE FOR MOVING CURSOR AND SCROLLING IMAGE ON SCREEN

BACKGROUND OF THE INVENTION

1. Field of the Invention

The present invention relates to an input device, in a computer body capable of moving a cursor or scrolling an image on screen, for moving the cursor or scrolling.

2. Description of the Prior Art

Through the use of an input device to be used for inputting data into a computer body, an image may be moved or an object displayed may be selected on a computer screen. For example, when an icon, which is a pattern for representing a function, which the computer has, as a symbol so as to make it easier to understand, is selected, an operator uses a mouse, which is one of input devices, to move a pointer onto an object icon for clicking or the like, whereby the operator can instruct various processing to the computer. When the pointer moves to a place which coincides with the indicated position of the object icon, the icon changes its display form in order to indicate that it has been selected. This allows the operator to confirm that the icon has been correctly selected.

When scrolling the screen, an input device having rotational input means is used in many instances. In the above-described input device, rotation of the rotational input means synchronizes with movement of the slider portion of a scroll bar, and rotating the rotational input means enables the screen to be scrolled. The operator can visually judge, on the basis of the position of the slider portion in the scroll bar, whether or not the screen, which scrolls, has reached the end.

When an object is selected by the conventional input device, there is only a visual criterion as to whether or not the object has been correctly selected, and it is difficult for the visually handicapped and beginners to operate a computer.

When scrolling the screen, an amount of images to be displayed on screen can be judged from a movement distance (movement velocity) of the slider portion on the scroll bar. Since, however, any difference in the movement distance (movement velocity) of the slider portion is also only judged visually, it is difficult to judge the amount of images, which can be displayed on screen.

SUMMARY OF THE INVENTION

The present invention has been achieved in order to solve the above-described problems, and its object is to improve the operability when the operator moves the cursor on the computer screen through the use of the input device or when scrolling the screen.

According to the present invention, there is provided an input device comprising: a display; a computer body in which software for displaying a screen including menu display and/or icon display on the display and software for moving cursor display on the screen have been housed; and input means for giving an operation input signal for moving the cursor display on the screen to the computer body, wherein the input means is provided with sensing power generating means for giving power that an operator feels on his hand, wherein in the computer body, there is housed a supervisory program for supervising that the cursor display has moved to a position which coincides with any of the menu display or a boundary position of the menu display and/or a position, which coincides with the icon display, and wherein when it has been supervised through the use of the supervisory program that the cursor display has reached each of the above-described positions, the computer body gives an operation command to the sensing power generating means.

In the above-described means, when the cursor reaches the position of the menu display on the screen, when it crosses the boundary line of the menu display, or when it reaches the icon display, in the above-described means, the operator is capable of feeling some type of power on the hand from the sensing power generating means in the input device through feedback from the computer body. Therefore, the operator can recognize through the feel of the hand without depending upon only the visual perception of sight that the cursor has reached each of the above-described positions.

According to the present invention, there is provided an input device comprising: a display; a computer body in which software for displaying a screen on the display and software for scrolling the screen have been housed; and input means for giving an operation input signal for scrolling the screen to the computer body, wherein the input means is provided with sensing power generating means for giving power that an operator feels on his hand, wherein in the computer body, there is housed a supervisory program for supervising a state of image data to be displayed on the display and wherein an operation command is given to the sensing power generating means from the computer body in accordance with the state of the image data supervised through the use of the supervisory program to make the state of the sensing power variable.

For example, when it supervises an amount of image data to be displayed on the screen and performs input for scrolling the screen through the use of the input means, the supervisory program gives an operation command for changing a time interval or magnitude of the sensing power to the sensing power generating means in response to magnitude of the amount of the image data.

In the above-described means, when scrolling an image displayed on the display through the use of the input means, the state of the sensing power to be given to the input means from the sensing power generating means, for example, the magnitude and the time interval (click interval) of the sensing power change in accordance with an amount, type and the like of images which are scrolled.

The input means in each of the inventions is a plane-shaped input pad or the like for outputting coordinate information when the surface is scanned with a mouse, a finger or an input pen.

When the input means is, for example, a mouse, there is preferably a mouse, and some type of power that the operator is capable of sensing is given to a click push-button provided on the mouse through the use of the sensing power generating means. Also, a mouse, in which some type of power that the operator is capable of sensing is given to the main body of the mouse, may be used.

In the case where the input means is a plane-shaped input pad for outputting coordinate information when the surface is scanned with a finger or an input pen, there may be used an input pad in which some type of power that the operator is capable of sensing is given to the input pad through the use of the sensing power generating means.

According to the present invention, there is provided an input device comprising: a display; a computer body in which software for displaying a screen on the display and software for scrolling the screen have been housed; and rotational input means for giving an operation input signal for scrolling the screen to the computer body, wherein there is provided load variable means for making a rotational load of the rotational input means variable, wherein in the computer body, there is housed a supervisory program for supervising a state of image data to be displayed on the display and wherein an operation command is given to the load variable means from the computer body in response to the state of the image data supervised through the use of the supervisory program to make the load on the rotational input means variable.

For example, when it supervises the amount of the image data to be displayed on the screen and performs input for scrolling the screen through the use of the rotational input means, the supervisory program gives an operation command for changing a rotational load to the load variable means in response to the magnitude of the amount, type and the like of the image data.

In this case, when the input device performs input for scrolling the screen through the use of the rotational input means, the supervisory program preferably supervises whether or not the screen, which scrolls, reaches an end of the scroll, and when the end is reached, gives an operation command for increasing the load on the rotational input means to the load variable means, or gives an operation command for stopping the rotation of the rotational input means to brake means separately provided from the load variable means.

When scrolling the image on the screen through the use of the rotational input means, the above-described means makes the load and the like of the rotational input means variable in response to the state of image data such as the amount and type of the image data to be displayed, and therefore, it becomes possible to recognize the state of the image through intuition from an operating reaction or the like on the hand.

DETAILED DESCRIPTION OF THE PREFERRED EMBODIMENTS

An input device according to the present invention has a computer body 1, an input device 10 provided with sensing power generating means, and a display 20.

Figure 1:
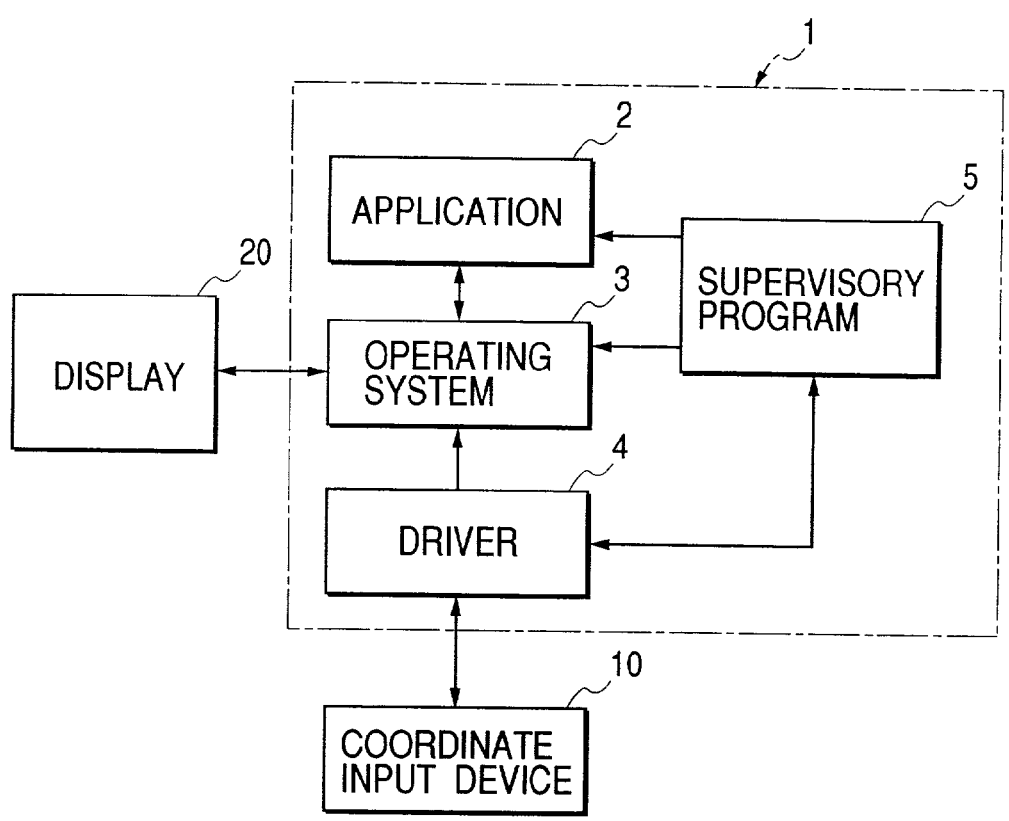
FIG. 1 is a block diagram showing a system for controlling the input device.

FIG. 1 is a block diagram showing a system for controlling the input device according to the present invention.

In a computer body 1, there are housed application software 2; an operating system 3; a supervisory program 5 for supervising these; and a driver 4 for a coordinate input device which is one of input means. To the computer body 1, the coordinate input device 10 is connected. This coordinate input device 10 is a mouse, a plane-shaped input pad or the like.

According to the operating system 3, a predetermined image is displayed on the display 20 in accordance with a program operation of the application software 2. An operation input signal from the coordinate input device 10 carries coordinate data, and this operation input signal is given to the driver 4. Control information responsive to the operation input signal is given to the operating system 3 from the driver 4, whereby for example, a cursor, which is referred to as a pointer, is displayed on an image displayed on the display 20, and this pointer is displayed so as to move on the image on the basis of the coordinate data to be transmitted from the coordinate input device 10.

The supervisory program 5 receives the coordinate data from the coordinate input device 10 from the driver 4 for recognizing, and supervises at which position on the image the pointer is displayed. As a result of this supervision, when the pointer moves to a position which coincides with a position which coincides with any of the menu display within the image display or a boundary position of the menu display, or a position which coincides with the icon display, the supervisory program gives an operation command to the driver 4. This operation command is data-processed within the driver 4 to be given to the coordinate input device 10 as a feedback command signal.

The coordinate input device 10 is a mouse or plane-shaped input pad as described above, but sensing power generating means to be described later is incorporated in these mouse and plane-shaped input pad. When the feedback command signal is given, the sensing power generating means is actuated to give a shock force to a hand with which the coordinate input device 10 is being manipulated in such a manner that the operator is caused to perceive by a physical force that the pointer has reached each of the above-described positions on the image.

Figure 2:
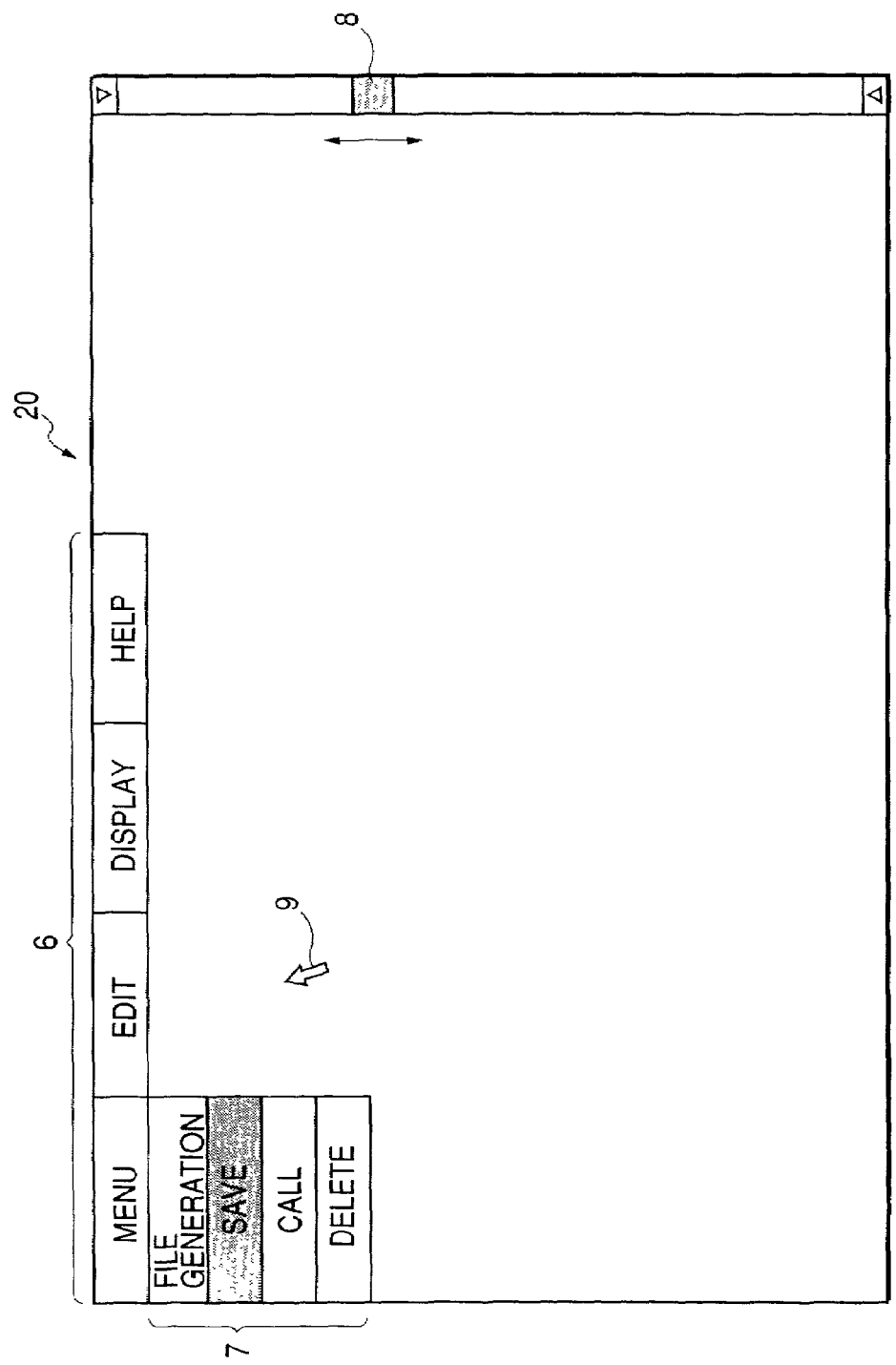
FIG. 2 is an explanatory view showing an example of a display format for image data.
Figure 3:
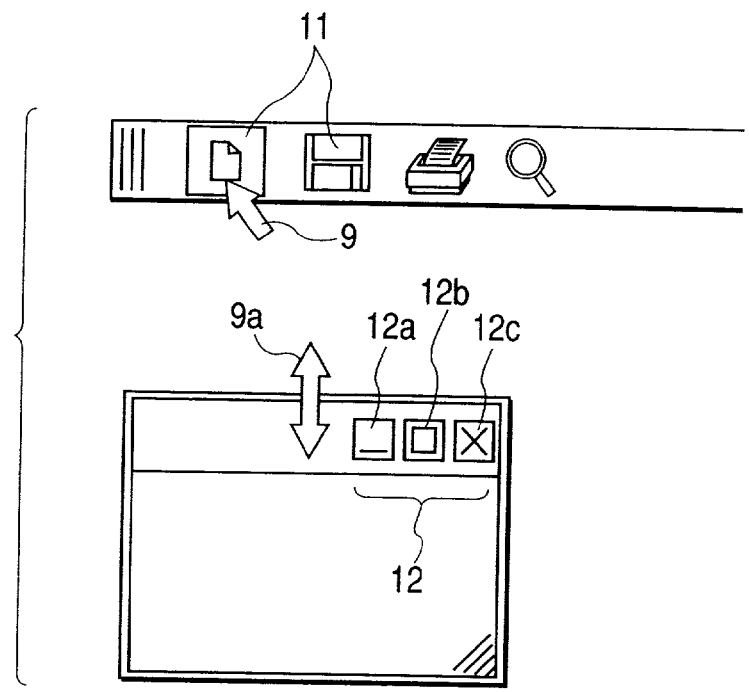
FIG. 3 is an explanatory view showing an example of a display format for image data.

FIGS. 2 and 3 are views showing an example of an image to be displayed on the display 20, and FIG. 2 is, for example, a document creation screen, and FIG. 3 is an explanatory view showing a menu screen and a window.

In the document creation screen shown in FIG. 2, when the pointer 9 coincides with the menu position such as "FILE GENERATION", "SAVE" "CALL" and "DELETE" of highlight 7 in a pull-down menu 6, or when it moves the menu boundary line between "FILE GENERATION" and "SAVE" by the operation of the coordinate input device 10, the feedback command signal actuates the sensing power generating means within the coordinate input device 10 to give sensing power to the operator. Therefore, when the pointer 9 is moved downward from above along the highlight 7, or is moved upward from below, click feeling is given to the operator of the coordinate input device 10 every time the pointer 9 passes through each menu of the highlight.

In this respect, when the pointer 9 coincides with each position of "MENU", "EDIT", "DISPLAY" and "HELP" of the pull-down menu 6, or when the pointer 9 crosses the boundaries, the sensing power generating means is actuated similarly.

When the pointer 9 coincides with the slider 8 of the scroll bar on the right side of the image displayed on the display 20 shown in FIG. 2, the sensing power generating means may be actuated similarly to give sensing power to the operator's hand.

Further, when the slider 8 is caused to move downward from above or upward from below through the use of the pointer 9, it may be arranged such that the sensing power generating means is intermittently actuated to give continuous click feeling to the operator's hand. At this time, it is possible to set the interval of the click feeling and the magnitude of the shock force in accordance with the amount of image data to be displayed on the display 20. This can be performed when the amount of the image data to be displayed on the display 20 through the use of the operating system 3 shown in FIG. 1 is recognized by the supervisory program 5, and on the basis thereof, the driver 4 is controlled to provide feedback to the mouse 15.

For example, when large volumes of image data are scrolled, the time interval for click feeling will be shortened, or a shock force to be given by the sensing power generating means will be made great, and when small volumes of image data are scrolled, the time interval for click feeling will be made longer, or the shock force will be made smaller. When small volumes of image data are scrolled, the time interval for click feeling may be shortened, or the shock force maybe made great conversely. Further, when scrolling the image data, the time interval for the click feeling may be changed or the shock force may be changed toward the end of the scroll.

Or when the pointer 9 is moving the slider 8, the sensing power generating means may be caused not to be actuated, and when the slider 8 moves to the lowest end of the scroll bar or the highest end thereof, the sensing power generating means may be actuated to give shock feeling or the like to the operator.

When the pointer 9 coincides with an icon 11 displayed on the image as shown in FIG. 3, the sensing power generating means may be actuated, or when the pointer 9 coincides with a menu 12 for displaying an icon 12a for minimizing the window, an icon 12b for maximizing the window, an icon 12c for erasing the window and the like, the sensing power generating means may be actuated. Further when the cursor changes from an arrow pointer 9 to an up-and-down-pointing arrow cursor 9a as shown in FIG. 3, the sensing power generating means may be actuated.

Figure 4:
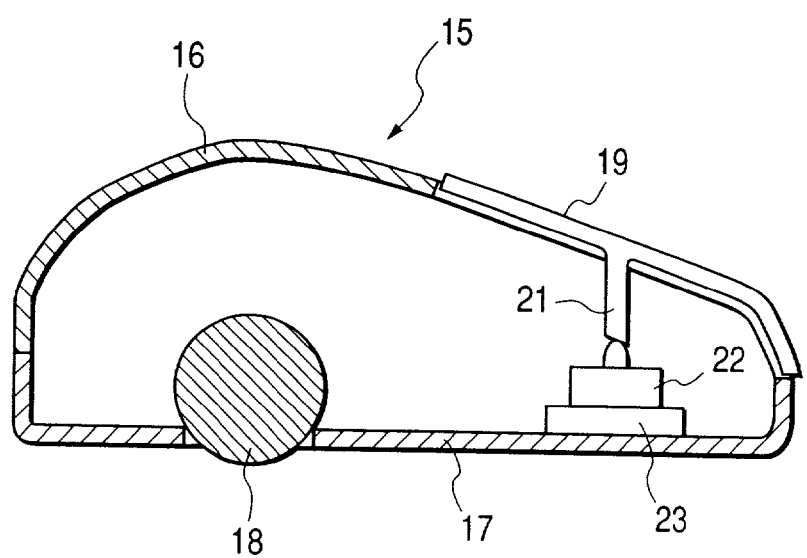
FIG. 4 is a sectional view showing a mouse as an example of a coordinate input device according to the present invention.

Also, when the click button 19 of the mouse 15 shown in FIG. 4 is pressed after the pointer 9 coincides with a desired icon, it may be arranged such that the sensing power generating means is actuated for the first time. Also, it may be arranged such that when the pointer 9 coincides with a desired icon, the sensing power generating means is actuated and when the click button 19 of the mouse 15 is pressed at the time, then vibration, shock and the like, which are generated from the sensing power generating means, are changed.

When changing the area of the window by moving the edge of the window through the use of the cursor 9a, the sensing power generating means may be intermittently actuated to give continuous click feeling to the operator.

In this respect, the sensing power generating means provided in the coordinate input device 10 generates a physical force such as a shock force that the operator is capable of directly feeling on his finger or fingertip. It may be, for example, a light shock or vibration to be given from the input device side to the operator's hand or fingertip that is touching the coordinate input device 10.

Figure 5:
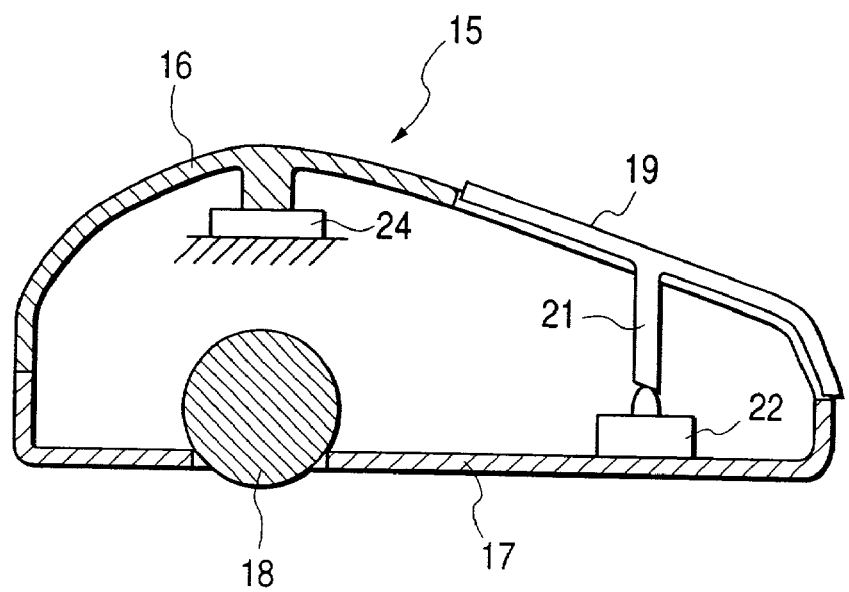
FIG. 5 is a sectional view showing a mouse as an example of a coordinate input device according to the present invention.
Figure 6:
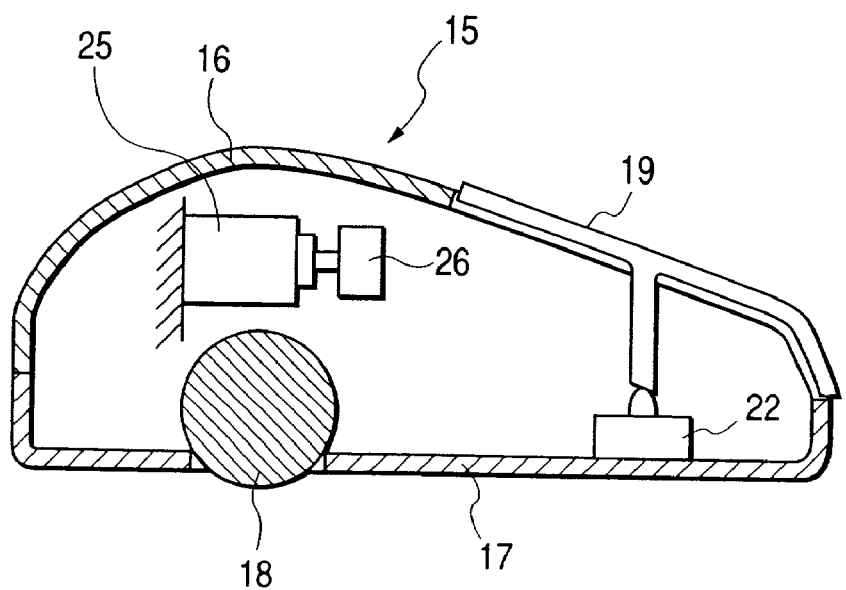
FIG. 6 is a sectional view showing a mouse as an example of a coordinate input device according to the present invention.

FIGS. 4 to 6 are sectional views showing a mouse 15 as an example of a coordinate input device 10 with the sensing power generating means mounted thereon.

The mouse 15 shown in FIG. 4 is provided with a ball 18, which is exposed to the base 17 of a body case 16, and within the body case 16, there is provided detection means for separating an amount of rotation of this ball 18 into an X-direction and a Y-direction for detecting. X-Y coordinate data is generated by this detection means to be given to the driver 4. On the front upper surface of the body case 16, there is provided a click button 19. A pressure projection 21 is integrally provided onto this click button 19, and this pressure projection 21 is adapted to be able to press a switch 22 within the body case 16. An operating signal for this switch 22 is given to the driver 4 together with the coordinate data and the like, which becomes a so-called "click operation" or "double-click operation" signal.

In FIG. 4, a stacked piezo-electric element 23 is provided between the switch 22 and the base 17 as the sensing power generating means. When a feedback command signal from the driver 4 is given to the mouse 15, the piezo-electric element 23 is actuated to give a single shock force or the shock force repeatedly to the click button 19 through the switch 22. This shock force is exerted on the finger touching the click button 19.

In this respect, the shock force may be directly given to the click button 19 from the piezo-electric element 23 without through the switch 22.

Also, in FIG. 5, a piezo-electric element 24 as the sensing power generating means is provided on the back surface side of the top surface of the body case 16 of the mouse 15. This piezo-electric element 24 directly gives a shock force to the body case 16.

In this respect, electric power is given to the mouse 15 from the computer body 1 through an interface such as USB. Within the mouse 15, there is provided an individual control unit, and on receipt of the feedback command signal from the driver 4, the control unit actuates a digital switch or the like to give the electric power to the piezo-electric element 23 or 24 for generating sensing power.

In FIG. 6, within the body case 16 of a mouse 15, there are provided a motor 25 and a weight 26 mounted to the rotating shaft of this motor 25 as the sensing power generating means. The weight has uneven distribution of mass with respect to the center of rotation. When a feedback command signal from the driver 4 is given, the motor 25 starts to rotate the weight 26. Since the weight has uneven distribution of mass with respect to the center of rotation, slight vibrations are continuously applied to the body case 16.

Figure 7:
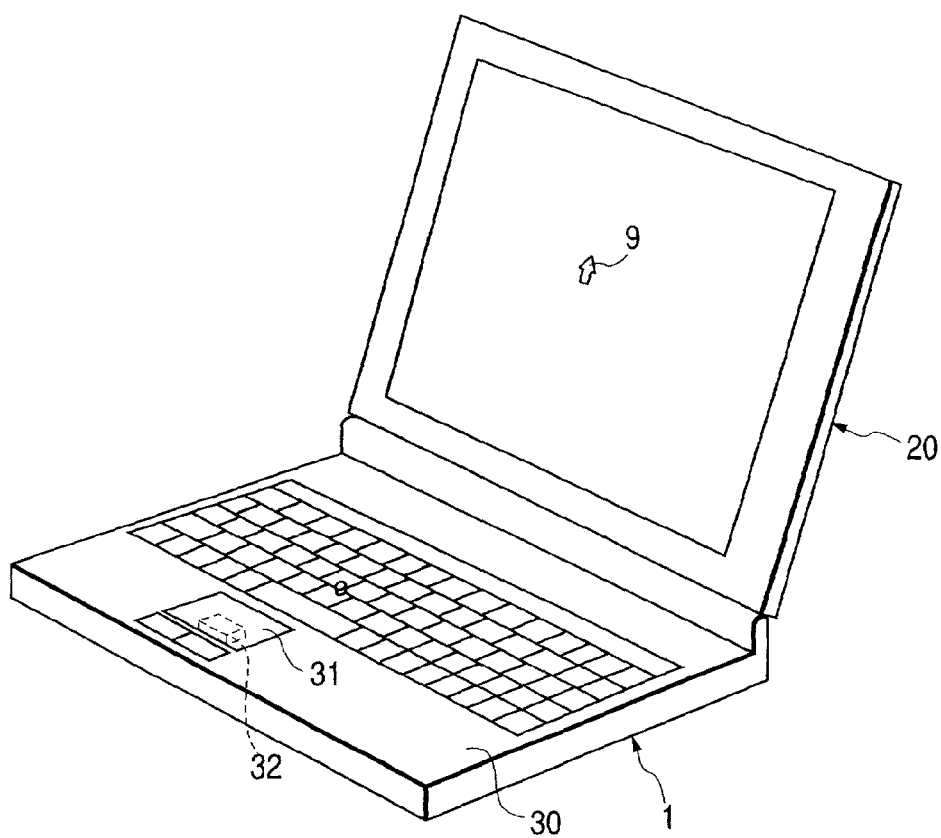
FIG. 7 is a perspective view showing a notebook type personal computer to which an input pad is mounted as an example of a coordinate input device.

FIG. 7 is a perspective view showing a notebook type personal computer (hereinafter, referred to as notebook personal computer) as another embodiment according to the present invention.

This notebook personal computer has a plane-shaped input pad 31 provided as the coordinate input device 10 together with a keyboard 30 in a computer body 1. This input pad 31 is of an electrostatic capacity detection type or a pressure sensitive detection type. This input pad is operated with the finger or a pen, whereby coordinate data is given to the driver 4.

Below this input pad 31, there is provided a piezo-electric element 32 as pressure sensing power generating means, and when a feedback command signal is given from the driver 4, the entire input pad 31 is pushed upward, and a shock force is given to the finger, a pen or the like for manipulating the input pad 31.

In this respect, even in this notebook personal computer, below or around the input pad 31, there may be disposed the motor 25 and the weight 26 which are shown in FIG. 6 to cause vibrations in the input pad 31, or in the vicinity thereof on the basis of a feedback command signal.

In this respect, as pressure sensing power generating means for generating such a shock force as described above, a solenoid mechanism or the like may be used in place of the piezo-electric element or motor.

In the case where an input pad 31 shown in FIG. 7 is used, an input pad, in which an image displayed on the display 20 is scrolled up and down when the right end or the like of the input pad is moved up and down by the finger, may be used. In this case, however, as in the case of the mouse, it is also possible to change the time interval and the magnitude of the shock force in accordance with the scroll state of the image.

Figure 8:
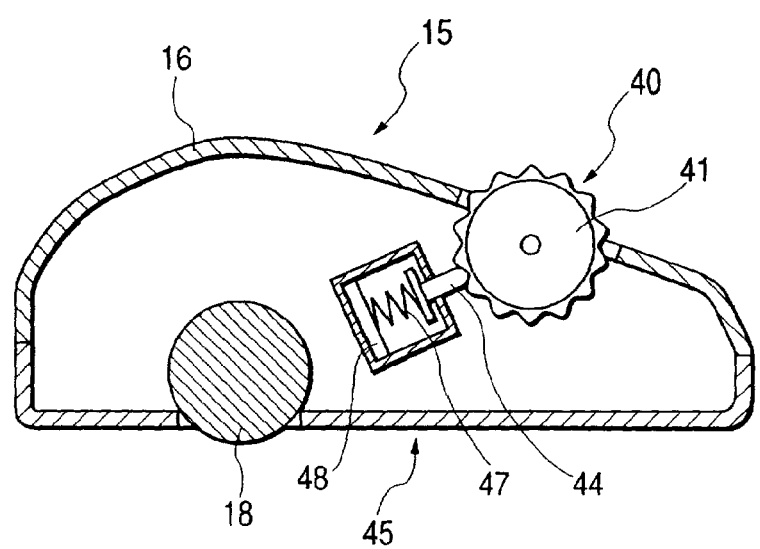
FIG. 8 is a sectional view showing a mouse to which rotational input means is mounted.

FIG. 8 shows rotational input means 40 as an embodiment according to the present invention. This rotational input means 40 has an operating wheel 41 provided above the body case 16 of the mouse 15. Within the body case 16 of the mouse 15, there is provided detection means for detecting an amount of rotation of the operating wheel 41. When this operating wheel 41 is rotated, data on the amount of rotation is given to the driver 4 within the computer body 1.

As shown in FIG. 8, within the body case 16, there is provided load variable means 45. This load variable means 45 has a pressing pad 44, which strikes against the outer periphery of the operating wheel 41, and a spring 47 for pressing the pressing pad 44, and is further provided with variable means 48 for making a resilient force of the spring 47 variable. This variable means 48 is a piezo-electric element, a solenoid mechanism, a pressing mechanism using a motor, or the like.

When the operating wheel 41 is rotated, contact between unevenness on the outer periphery of the operating wheel 41 and the pressing pad 44 gives rotational click feeling, but the resilient force of the spring 47 is made variable by the variable means 48, whereby the load of the click feeling is adapted to change.

When data based on the amount of rotation from the rotational input means 40 is given to the driver 4 of the computer body 1, an image displayed on the display 20 is scrolled under the control of the operating system 3.

The supervisory program 5 shown in FIG. 1 recognizes the data amount of images displayed on the display 20 through the use of the operating system 3, a control command is given to the driver 4 in accordance with the data amount of these images, and a feedback command signal is given to the rotational input means 40 shown in FIG. 8, that is, the mouse 15. In the load variable means 45, the feedback command signal actuates the variable means 48 to fluctuate the load of rotational click feeling of the operating wheel 41.

For example, when large volumes of image data are displayed on the display 20, the load to be given to the wheel 41 will be made great, and when small volumes of image data are displayed, the load to be given to the wheel 41 will be made smaller. When large volumes of image data are displayed, the load may be reduced conversely, and when small volumes of image data are displayed, the load may be increased.

Or, for example, when the image will be continuously scrolled upward, the load to be exerted on the operating wheel 41 first may be made great, and the load may be continuously or stepwise made smaller as the image moves upward. Also, conversely, as the image is scrolled, the load may be continuously or stepwise increased.

When scrolling of the image has been completed, the load can be maximized through the use of the load variable means 45 to stop so as to prevent the operating wheel 41 from rotating. In this case, the rotation of the operating wheel 41 can also be stopped through the use of any other stopper mechanism than the load variable means 45.

As described above, an input device according to the present invention is adapted to change the feeling that propagates to the operator's hand or the like in accordance with the state of the image when the operator is moving the cursor on the computer screen through the use of the input device, or when scrolling the image. Therefore, excellent operating feeling can be obtained without depending upon only the sense of sight.

What is claimed is:

1. An input device comprising:
   a display;
   a computer body in which software for displaying a screen on the display and software for scrolling the screen have been hosed; and
   an operating wheel provided in an input means to scroll the screen to give an operation input signal for scrolling the screen to the computer body,
   wherein there is provided load variable means for making a rotational load of the operating wheel variable, wherein in the computer body, there is housed a supervisory program for supervising a state of image data to be displayed on the display and wherein an operation command is given to the load variable means from the computer body in response to the state of the image data supervised through the use of the supervisory program to make the load on the operating wheel variable, wherein the load variable means comprises a variable means that receives the operation command to fluctuate a load of the operating wheel in a rotational click feel manner, and
   the load variable means comprises a pressing pad which contacts an outer periphery of the operating wheel to give the operating wheel the rotational click feel.

2. An input device according to claim 1, wherein the supervisory program supervises the amount of image data to be displayed on the screen, and performs input for scrolling the screen through the use of the operating wheel, the supervisory program gives an operation command for changing a rotational load to the load variable means in response to a magnitude of the amount and type of the image data.

3. An input device according to claim 1, wherein when the supervisory program performs input for scrolling the screen through the use of the rotational input means, the supervisory program supervises whether or not the screen, which scrolls, reaches an end of the scroll, and when the end is reached, gives an operation command for increasing the load on the rotational input means to the load variable means, or gives an operation command for stopping the rotation of the rotational input means to brake means separately provided from the load variable means.

4. An input device according to claim 1, wherein the image data is being scrolled upward and the load exerted on the operating wheel is great, wherein the load is continuously or stepwise made smaller as the image data is scrolled upward.

5. An input device according to claim 4, wherein the image data is scrolled upward and the load is maximized by using the load variable means to prevent the operating wheel from rotating.

* * * * *